(12) United States Patent
Bhat et al.

(10) Patent No.: US 6,769,017 B1
(45) Date of Patent: Jul. 27, 2004

(54) APPARATUS FOR AND METHOD OF MEMORY-AFFINITY PROCESS SCHEDULING IN CC-NUMA SYSTEMS

(75) Inventors: Prashanth Balakrishna Bhat, Foster City, CA (US); Kenneth M. Wilson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/524,175

(22) Filed: Mar. 13, 2000

(51) Int. Cl.[7] ............................................. G06F 15/167
(52) U.S. Cl. .................... 709/214; 711/147; 711/151; 711/152; 711/154
(58) Field of Search ......................... 709/214; 711/147, 711/154, 156, 170, 151, 152; 718/102, 104, 105

(56) References Cited

U.S. PATENT DOCUMENTS

| | | | | | |
|---|---|---|---|---|---|
| 5,784,697 A | | 7/1998 | Funk et al. | ................. | 711/170 |
| 6,035,377 A | * | 3/2000 | James et al. | ................. | 711/147 |
| 6,035,378 A | * | 3/2000 | James | ......................... | 711/147 |
| 6,269,390 B1 | * | 7/2001 | Boland | ........................ | 709/100 |
| 6,289,369 B1 | * | 9/2001 | Sundaresan | ................. | 709/103 |
| 6,336,177 B1 | * | 1/2002 | Stevens | ...................... | 711/170 |
| 6,453,408 B1 | * | 9/2002 | Fiske et al. | .................. | 712/29 |
| 6,499,028 B1 | * | 12/2002 | Brock et al. | .................. | 707/4 |

* cited by examiner

*Primary Examiner*—John Follansbee
*Assistant Examiner*—Jinsong Hu

(57) ABSTRACT

An apparatus for and a method of memory-affinity process scheduling in CC-NUMA systems. The system includes a plurality of nodes connected to a network. A plurality of processes are running on the various nodes of the system. The system further includes at least one memory-affinity counter for each executing process for each node of the system. Process scheduling begins by assigning processes to nodes. During execution, the memory-affinity counters are incremented on every memory access. At a process rescheduling interval, the memory-affinity counters are evaluated and rescheduling is performed based on a preselected policy. At a reset interval, the memory-affinity counters are adjusted to reduce the impact of older memory accesses. The resulting memory-affinity process scheduling is NUMA aware.

19 Claims, 3 Drawing Sheets

APPARATUS FOR AND METHOD OF MEMORY-AFFINITY PROCESS SCHEDULING IN CC-NUMA SYSTEMS

BACKGROUND OF THE INVENTION

1. Field of Invention

The present invention relates generally to the field of computer system memory and pertains more particularly to an apparatus for and a method of memory-affinity process scheduling in CC-NUMA systems.

2. Discussion of the Prior Art

Modern computer systems are often comprised of multiple forms and locations of memory. The memory subsystem is typically organized hierarchically. For example, from cache memory of various levels at the top to main memory and finally to hard disc memory. A processor in search of data or instructions looks first in the cache memory, which is closest to the processor. If the information is not found there, then the request is passed next to the main memory and finally to the hard disc. The relative sizes and performance of the memory units are conditioned primarily by economic considerations. Generally, the higher the memory unit is in the hierarchy the higher its performance and the higher its cost. For reference purposes, the memory subsystem will be divided into "caches" and "memory." The term memory will cover every form of memory other than caches. Information that is frequently accessed is stored in caches and information that is less frequently accessed is stored in memory. Caches allow higher system performance because the information can typically be accessed from the cache faster than from the memory. Relatively speaking, this is especially true when the memory is in the form of a hard disk.

For example, turning first to FIG. 1, a block diagram of a Cache Coherent Non-Uniform Memory Access (CC-NUMA) system 10 including a network 12 that is interfaced to multiple nodes 14 is shown. In this instance N, where N is greater than or equal to four, nodes are implied by the numbering from Node 0 to Node (N–1). Since in general all of the nodes are alike, only four nodes are shown for convenience. Based on the discussion that follows, one of ordinary skill in the art will realize that the present invention will perform on any system having two or more nodes. Each node includes a processor 16, a cache 18, a memory controller 20, and a memory 22 connected as shown. The memory controller for each node is connected to the network. The network operates based on any conventional protocol.

A cache consists of a cache data portion and a cache tag portion. The cache data portion contains the information that is currently stored in the cache. The cache tag portion contains the addresses of the locations where the information is stored. Generally, the cache data will be larger than the cache tags. The cache data and the cache tags will not necessarily be stored together, depending on the design. When a specific piece of information is requested, one or more of the cache tags are searched for the address of the requested information. Which cache tags are searched will depend on the cache design. If the address of the requested information is present in the cache tags, then the information will be available from that address in the cache data. If the address is not present, then the information may be available from memory.

In general, there are two cache applications that will be considered. First, there are caches integral with or local to a node and interfaced to a processor. Second, there are caches external to or remote from a node and interfaced with a network. Caches must be designed in such a way that their latency meets the timing requirements of the requesting components such as the processor or the network. For example, consider the design of the network. A processor or other agent on the network that requires a specific piece of information will issue what is known as a miss in the form of the address of the information on the network. This leg is known as the address phase. Subsequently, all caches or other agents attached to the network must indicate whether the information at the issued address is located there. This leg is known as the snoop phase. Typically, the network design specifies that the cache must supply its snoop response within a fixed time interval after the address has been issued on the network. If the cache is not designed to satisfy this timing requirement, it will lead to sub-optimal usage of the network, thus lowering system performance.

Of course, remote memory has a longer access time than local memory. On most conventional CC-NUMA systems, the difference in memory latency between a remote miss and a local miss may be a factor of two or greater. The overall system performance can therefore be significantly influenced by the local miss ratio which is defined as:

$$\text{Local Miss Ratio} = \frac{\text{Number of Local Misses}}{\text{Number of Total Misses}}. \quad (1)$$

The local miss ratio is influenced by several factors including memory page placement in the memory of the system. Also of influence is the process scheduling of the processor time by the operating system. To ensure fairness among several concurrently executing application programs and to reduce idle time of the processor, the operating system may move a process from one node to another during its execution. Since the node on which the process executes determines whether the cache miss is local or remote, the influence on the local miss ratio of the process scheduling policy can be significant.

Conventional process scheduling policies do not incorporate support for NUMA and are often derived from the traditional Unix scheduling framework. As in the traditional Unix framework, ready processes are placed in one of several run-queues. A distinct set of run-queues exists for every processor. When an application is created, processes are assigned to processors using a round-robin or other such policy. Based on the scheduling policy, processes are chosen from the run-queues for execution on the processors.

Conventional load balancing is performed during the execution of the application. At each load balance event, the number of processes in the run-queues of each processor is examined. If the variation in the load between the processors is sufficiently high, then a process is moved from the highest loaded processor to a lesser loaded processor. Apart from such synchronized load balancing, a processor can also steal a process from the run-queues of another processor if its own run-queues are empty.

Some of the conventional process scheduling policies attempt to place a process on the same processor on which it last executed. This allows for reuse of cache contents and is known as processor- or cache-affinity scheduling. In a NUMA system, it is also important that the process is close to the memory pages that it uses. The synchronized load balancing and process stealing mechanisms in conventional operating systems can result in a process being moved far away from their memory pages. Such scheduling policies can lead to performance degradation in a NUMA system.

A definite need exists for a system having an ability to adapt to changes in the memory access pattern of a process. In particular, a need exists for a system which is capable of tracking the access pattern of a process during run-time. Ideally, such a system would have a lower cost and a higher productivity than conventional systems. With a system of this type, system performance can be enhanced. A primary purpose of the present invention is to solve this need and provide further, related advantages.

SUMMARY OF THE INVENTION

An apparatus for and a method of memory-affinity process scheduling in CC-NUMA systems is disclosed. The system includes a plurality of nodes connected to a network. A plurality of processes are running on the various nodes of the system. The system further includes at least one memory-affinity counter for each executing process for each node of the system. Process scheduling begins by assigning processes to nodes. During execution, the memory-affinity counters are incremented on every memory access. At a process rescheduling interval, the memory-affinity counters are evaluated and rescheduling is performed based on a preselected policy. At a reset interval, the memory-affinity counters are adjusted to reduce the impact of older memory accesses. The resulting memory-affinity process scheduling is NUMA aware.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Memory-affinity process scheduling is based on the assumption that the recent memory access pattern of a process is a good indication of the access pattern of the process in the near future. Informally stated, memory-affinity process scheduling migrates a process to a node that is likely to contain the greatest number of the memory pages for that process.

Figure 1:
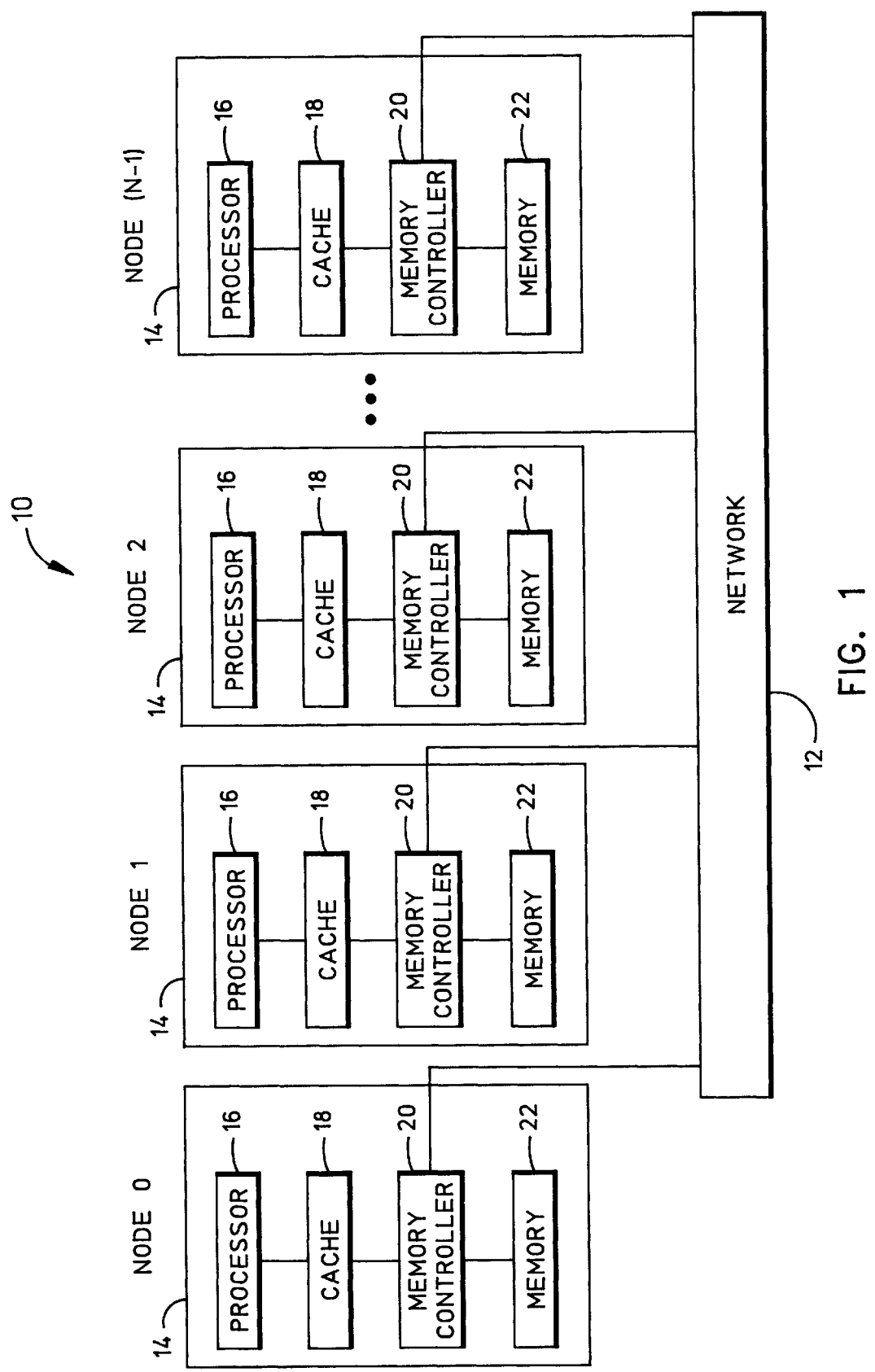
FIG. 1 is a block diagram of a CC-NUMA system including a network that is interfaced to multiple nodes.
Figure 2:
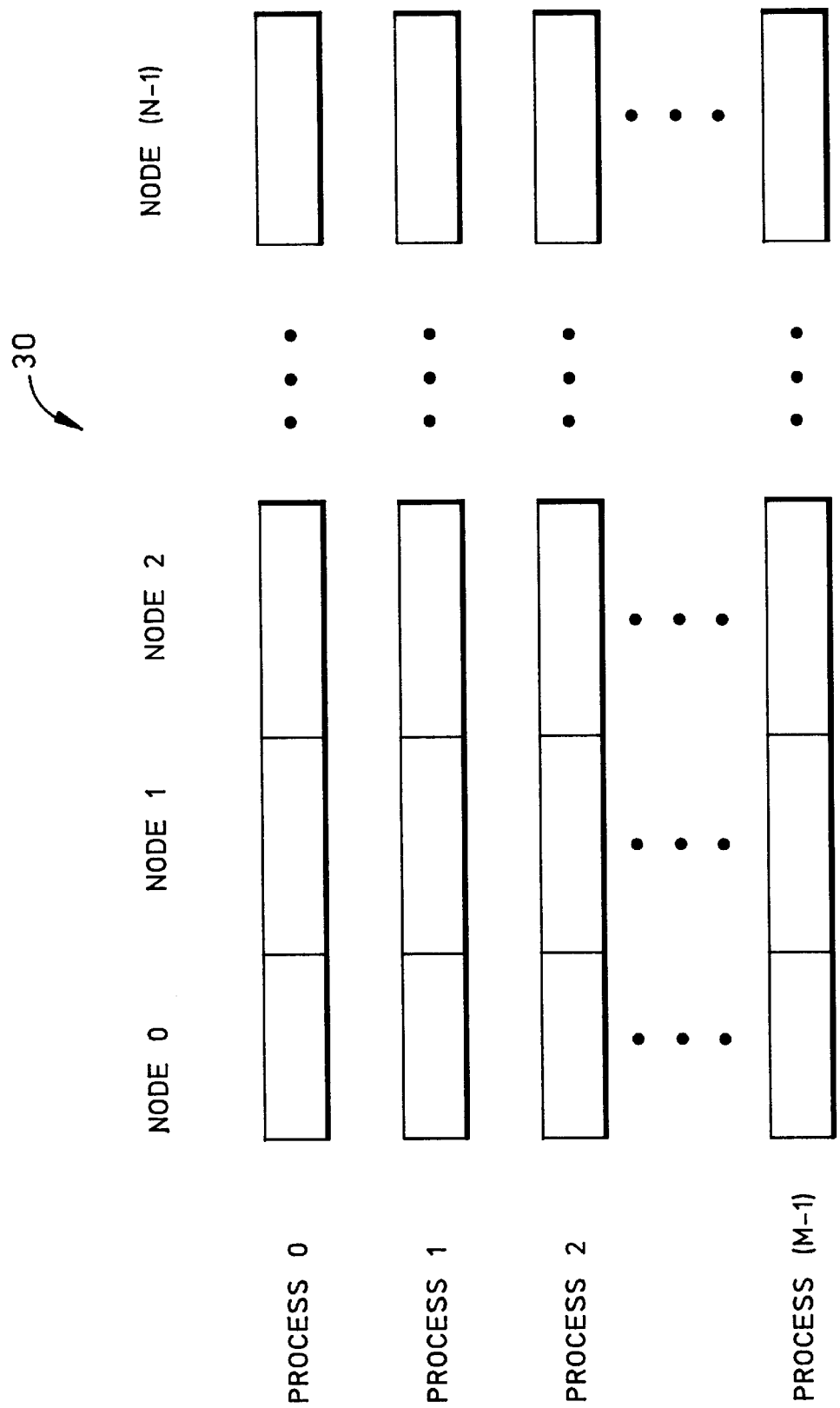
FIG. 2 is a block diagram of an array of memory-affinity counters according to one embodiment of the present invention.

Turning now to FIG. 2, a block diagram of an array 30 of memory-affinity counters according to one embodiment of the present invention is shown. In this instance, as in FIG. 1 above, N nodes are implied and are numbered from 0 to N−1. The nodes are arranged along the horizontal direction of the array. Along the vertical direction of the array are arranged a plurality of processes. In this instance M, where M is greater than or equal to four, processes are implied by the numbering from 0 to M−1. Based on the discussion that follows, one of ordinary skill in the art will realize that the present invention will perform on any system with at least one process. In accordance with this embodiment of the invention, each node has a number of memory-affinity counters equal to the product of N times M. Here sixteen counters are shown. Preferably the counters would be located within the processor 16 of FIG. 1, but other locations are also possible. Each counter corresponds to a specific node-process pair. For example, the counter shown in the upper right of the array corresponds to node N−1 and process 0. This can be denoted as (N−1, 0). A cache miss from process 0 to node N−1 results in an increment of counter (N−1, 0). In this way, the array tracks the affinity between the processes and the nodes. This information is then used to determine the node on which a particular process should be executed.

The array 30 of memory-affinity counters shown in FIG. 2 entails a large amount of counter hardware. A more preferred embodiment of the present invention includes a set of N counters and an array of N by M−1 memory registers. Based on the example of FIG. 2 where both N and M are equal to four, this preferred embodiment would require four counters and twelve memory registers. This represents a savings of twelve counters at the cost of twelve memory registers. Preferably the memory registers would be located in cache 18 of FIG. 1, and other locations are also possible, including memory 22 of FIG. 1. The counters are loaded with the values corresponding to the currently executing process. On a cache miss from the currently executing process to node k, the kth counter is incremented. Note that the set of counters do not need to be aware of which process is executing. When execution switches from a first process to a second process, the values of the counters for the first process are stored into memory and the counters are loaded with the values for the second process from memory. After loading of the counters, the second process then executes and the appropriate counters are incremented.

Figure 3:
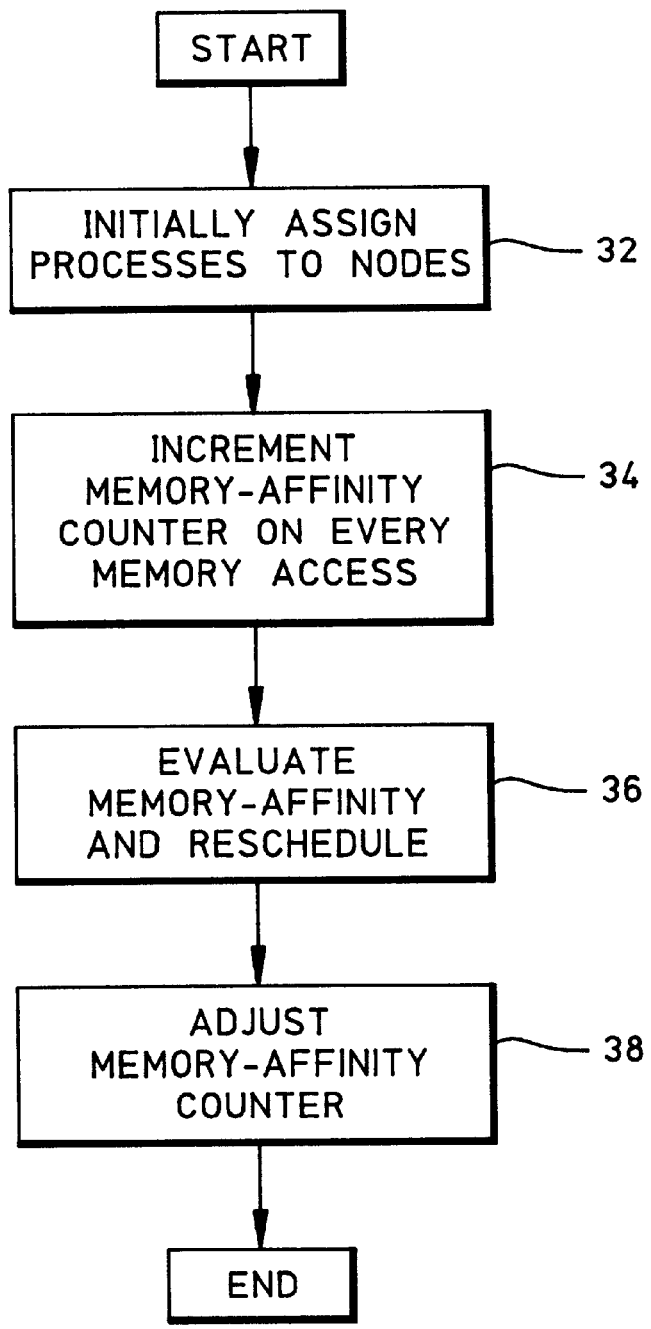
FIG. 3 is a flow diagram of the memory-affinity scheduling process according to one embodiment of the present invention.

Turning now to FIG. 3, a flow diagram of the memory-affinity scheduling process according to one embodiment of the present invention is shown. The process begins at Start. At block 32, the scheduling process initially assigns the executing processes to the various nodes. Any suitable placement policy can be used as the scheduling process will subsequently compensate for poor initial placements. For example, a round-robin placement policy would suffice. Within each node, a separate queue of processes is maintained for each processor. Each processor executes processes from its queue in a time-sliced manner. At block 34, the scheduling process increments the appropriate memory-affinity counter on every memory access. This continues for a preselected cycle known as the rescheduling interval. The rescheduling interval may be a set period of time or a set number of memory accesses. Since the initial assignment may be poor, the rescheduling interval may instead be dynamic with greater frequency early and lesser frequency over time. This would provide quick recovery from poor initial placement without over rescheduling later. Alternatively, the rescheduling interval may be based on performance measurement. For example, the interval may expire if the memory locality drops below a predefined threshold. This would prevent unnecessary rescheduling. One of ordinary skill in the art will recognize that a wide variety of rescheduling intervals are possible. After the expiration of the rescheduling interval, the scheduling process proceeds to block 36.

At block 36, the scheduling process evaluates the memory-affinity of all of the node-process pairs. The memory-affinity is based on the counter values and can be defined as the percentage of the memory accesses from the process that are addressed to the node. Thus, a process has a memory-affinity value of x to a node, if the counter for that node constitutes x percent of the memory accesses from that process. The memory-affinity between process j and node k in a system having N nodes can be calculated as follows:

$$MemoryAffinity(k, j) = \frac{counter[k,j]}{\sum_{i=0}^{N-1} counter[i, j]} \times 100, \quad (2)$$

where counter[k,j] is the value of the counter for node-process pair (k,j). The executing processes are then rescheduled based on a predetermined scheduling policy. The scheduling policy may schedule the process on the node for which the process has the highest memory-affinity, that is, the node whose counter has the highest value. Alternatively, the scheduling policy may schedule the process on a node only if the memory-affinity exceeds a predetermined threshold value. One of ordinary skill in the art will recognize that a wide variety of scheduling policies are possible.

It should be noted that rigid compliance to scheduling based on memory-affinity can result in a load imbalance within the system. The processes may become unevenly distributed among the nodes. Consequently, some processors may be idle while processes are waiting in the ready queue of other processors. The overall processor utilization can therefore be degraded. In the worst case, each process may independently choose the same node as having its highest memory-affinity. This would result in all of the processes being scheduled for one node and none being scheduled for any of the other nodes. Thus, sub-optimal scheduling choices may have to be made with respect to memory-affinity to enable improved load distribution among the various nodes of the system.

One method to improve load distribution is to introduce a load imbalance parameter into the scheduling policy. The parameter, to be known as Maxload, limits the maximum number of processes assigned to any node and is calculated as follows:

$$Maxload = \left\lceil \frac{NumProcesses}{NumNodes} \times \left(1 + \frac{LoadImbalance}{100}\right) \right\rceil, \quad (3)$$

where NumProcesses is the total number of processes, NumNodes is the total number of nodes, and LoadImbalance is the percent of allowable imbalance. For example, if LoadImbalance was chosen to be ten, then Maxload would be 110% of the average load for each node of the system. The scheduling policy would then be prevented from scheduling additional processes to a node that was already scheduled to take Maxload. The additional processes would then be scheduled to an alternate node. The selection of the alternate node may be based on memory-affinity as well, but that would not necessarily be the case. The alternate node could just as well be the least loaded node.

A more comprehensive scheduling policy would take into consideration trends in memory-affinity and not just peaks. Over time, some processes will exhibit a very strong affinity to a particular node and very low affinity to the other nodes. Alternatively, some processes will exhibit a near uniform affinity to a number of nodes. If sub-optimal memory-affinity scheduling is to be done, it is important that processes with strong affinity to a particular node are scheduled only on that node. Processes with more uniform affinity can be scheduled on their second and third choice nodes without severely impacting memory locality. It is therefore preferable to order processes in decreasing order of their amount of memory-affinity. The scheduling policy can then assign processes to nodes in this order. Processes at the top of the list can be assigned to their highest affinity nodes. As the list is traversed and nodes approach their Maxload limit, then sub-optimal scheduling might be necessary for the processes near the bottom of the list. The processes can be ordered based on the standard deviation of their memory-affinity counter values. If the standard deviation is high, then the skew in the counter values is high and the process has a strong affinity to a particular node. If the standard deviation is low, then the counter values are in the same range and the process has a uniform affinity to a number of nodes. Alternatively, the processes can be ordered by using thresholds to determine when the counter values, or differences between counter values, are large enough to warrant process rescheduling. One of ordinary skill in the art will recognize that a wide variety of ordering criteria are possible including a combination of the above. With the incorporation of the load imbalance parameter, the scheduling policy thus achieves a trade-off between processor utilization and memory-affinity. The amount of this trade-off is controllable and will depend on the circumstances. After the expiration of a reset interval, the scheduling process proceeds to block 38.

At block 38, the memory-affinity counters are adjusted. As stated above, memory-affinity process scheduling is based on the assumption that the recent memory access pattern of a process is a good indication of the access pattern of the process in the near future. Since individual phases of an application typically have different access patterns, it is the goal of adjustment to reduce the impact of older access patterns. It is therefore desirable to ensure that the influence of accesses in the recent past be greater then the influence of accesses in the distant past on memory-affinity measures and scheduling policies. The counters can be adjusted by right-shifting the binary counter values by one or more bits. This has the result of reducing the counter values by half or more. Over time, this will have the effect of reducing the influence of older accesses. Alternatively, the counters can be adjusted by clearing the counter values altogether. One of ordinary skill in the art will recognize that a wide variety of counter adjustment policies are possible and that it may not be necessary to adjust all of the counters every time. Although the reset interval and the rescheduling interval may be the same, this will not necessarily be the case and will depend on the circumstances. Generally, the reset interval will be longer than the rescheduling interval. As above with the rescheduling interval, the reset interval may be static or dynamic. Again, a wide variety of reset intervals are possible. Blocks 34, 36, and 38 are repeated during the memory-affinity scheduling process. The order of the blocks will not necessarily be as shown and will depend on the rescheduling and reset intervals and the circumstances.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of memory-affinity process scheduling in a cache coherent non-uniform memory access (CC-NUMA) system including a plurality of nodes and a network, wherein each node is connected to the network and each node includes a plurality of memory-affinity counters, the system further including at least one process initially assigned to one of the plurality of nodes creating a node-process pair, the method comprising the steps of:
   incrementing, on every memory access, a corresponding memory-affinity counter;
   evaluating the memory-affinity of each nodes-process pair upon the expiration of a rescheduling interval;
   rescheduling the processes based on a predetermined scheduling policy; and
   adjusting at least one of the plurality of memory-affinity counters upon the expiration of a reset interval, wherein the predetermined scheduling policy involves scheduling the process based on trends in memory-affinity.

2. The method according to claim 1 wherein the rescheduling interval is static.

3. The method according to claim 1 wherein the rescheduling interval is dynamic.

4. The method according to claim 1 wherein the predetermined scheduling policy includes scheduling the process on the node for which the process has the highest memory-affinity.

5. The method according to claim 1 wherein the predetermined scheduling policy includes scheduling the process on node only if the memory-affinity exceeds a predetermined threshold value.

6. The method according to claim 1 wherein the predetermined scheduling policy involves a load imbalance parameter that limits the maximum number of processes that can be scheduled on any node.

7. The method according to claim 1 wherein adjusting at least one of the plurality of memory-affinity counters involves right shifting the binary counter value by at least one bit.

8. The method according to claim 1 wherein adjusting at least one of the plurality of memory-affinity counters involves clearing the counter value.

9. The method according to claim 1 wherein the reset interval is static.

10. The method according to claim 1 wherein the reset interval is dynamic.

11. An apparatus for memory-affinity process scheduling in a cache coherent non-uniform memory access (CC-NUMA) system including a plurality of nodes and a network wherein each node is connected to the network and each node comprises a plurality of memory-affinity counters, the system further comprising at least one process initially assigned to one of the plurality of nodes creating a node-process pair, the apparatus comprising:
   means for incrementing on every memory access, a corresponding memory-affinity counter;
   means for evaluating the memory-affinity of each nodes-process pair upon the expiration of a rescheduling interval;
   rescheduling the processes based on a predetermined scheduling policy; and
   means for adjusting at least one of the plurality of memory-affinity counters upon the expiration of a reset interval, wherein the predetermined scheduling policy involves scheduling the process based on trends in memory-affinity.

12. The apparatus according to claim 11 wherein the predetermined scheduling policy involves means for scheduling the process on the node for which the process has the highest memory-affinity.

13. The apparatus according to claim 11 wherein the predetermined scheduling policy involves scheduling the process on node only if the memory-affinity exceeds a predetermined threshold value.

14. The apparatus according to claim 11 wherein the predetermined scheduling policy involves a load imbalance parameter that limits the maximum number of processes that can be scheduled on any node.

15. A method for memory-affinity process scheduling in a cache coherent non-uniform memory access (CC-NUMA) system with a plurality of nodes and a network for interconnecting the nodes, the nodes including one or more processors for executing processes associated with a program, comprising:
   assigning processes associated with a program to various of the plurality of nodes;
   during a rescheduling interval,
      maintaining a queue in each node corresponding to each of its processors wherein each processor executes processes from its corresponding queue, and
      incrementing one or more of memory-affinity counters for each of the plurality of nodes wherein, on every memory access, the corresponding memory-affinity counter is incremented;
   upon expiration of the rescheduling interval,
      evaluating the plurality of memory-affinity counters for the various nodes, and
      rescheduling the processes associated with the program to the various nodes based on a predetermined policy; and
   upon the expiration of a reset interval, adjusting the plurality of memory-affinity counters for the various nodes.

16. The method of claim, 15, wherein the predetermined policy includes a load imbalance parameter.

17. An apparatus for memory-affinity process scheduling in a cache coherent non-uniform memory access (CC- NUMA) system comprising a plurality of nodes and a network, wherein each node is connected to the network, the system further comprising at least one process initially assigned to one of the plurality of nodes, the apparatus comprising:

- a plurality of memory-affinity counters for each of the plurality of nodes wherein, on every memory access, the corresponding memory-affinity counter is incremented;
- an array of memory registers in which the memory-affinity counter values corresponding to the currently non-executing processes are stored;
- means for loading the counter values for a second process from the array of memory registers into the plurality of memory-affinity counters; and
- means for rescheduling processes based on a predetermined scheduling policy that involves scheduling the processes based on trends in memory affinity.

18. A method of memory-affinity process scheduling in a cache coherent non-uniform memory access (CC-NUMA) system including a plurality of nodes and a network, wherein each node is connected to the network and each node includes a plurality of memory-affinity counters, the system further including at least one process initially assigned to one of the plurality of nodes creating a node-process pair, the method comprising the steps of:

- incrementing, on every memory access, a corresponding memory-affinity counter;
- evaluating the memory-affinity of each nodes-process pair upon the expiration of a rescheduling interval;
- rescheduling the processes based on a predetermined scheduling policy; and
- adjusting at least one of the plurality of memory-affinity counters upon the expiration of a reset interval, wherein the predetermined scheduling policy includes scheduling the process on the node for which the process has the highest memory-affinity.

19. An apparatus for memory-affinity process scheduling in a cache coherent non-uniform memory access (CC-NUMA) system including a plurality of nodes and a network, wherein each node is connected to the network and each node comprises a plurality of memory-affinity counters, the system further comprising at least one process initially assigned to one of the plurality of nodes creating a node-process pair, the apparatus comprising:

- means for incrementing, on every memory access, a corresponding memory-affinity counter;
- means for evaluating the memory-affinity of each nodes-process pair upon the expiration of a rescheduling interval;
- rescheduling the processes based on a predetermined scheduling policy; and
- means for adjusting at least one of the plurality of memory-affinity counters upon the expiration of a reset interval, wherein the predetermined scheduling policy involves means for scheduling the process on the node for which the process has the highest memory-affinity.

* * * * *